Oct. 25, 1960     H. B. JOHNSON     2,957,509
SECTIONAL ANTI-SKID TRACTION ATTACHMENT
Filed Jan. 27, 1959     2 Sheets-Sheet 2
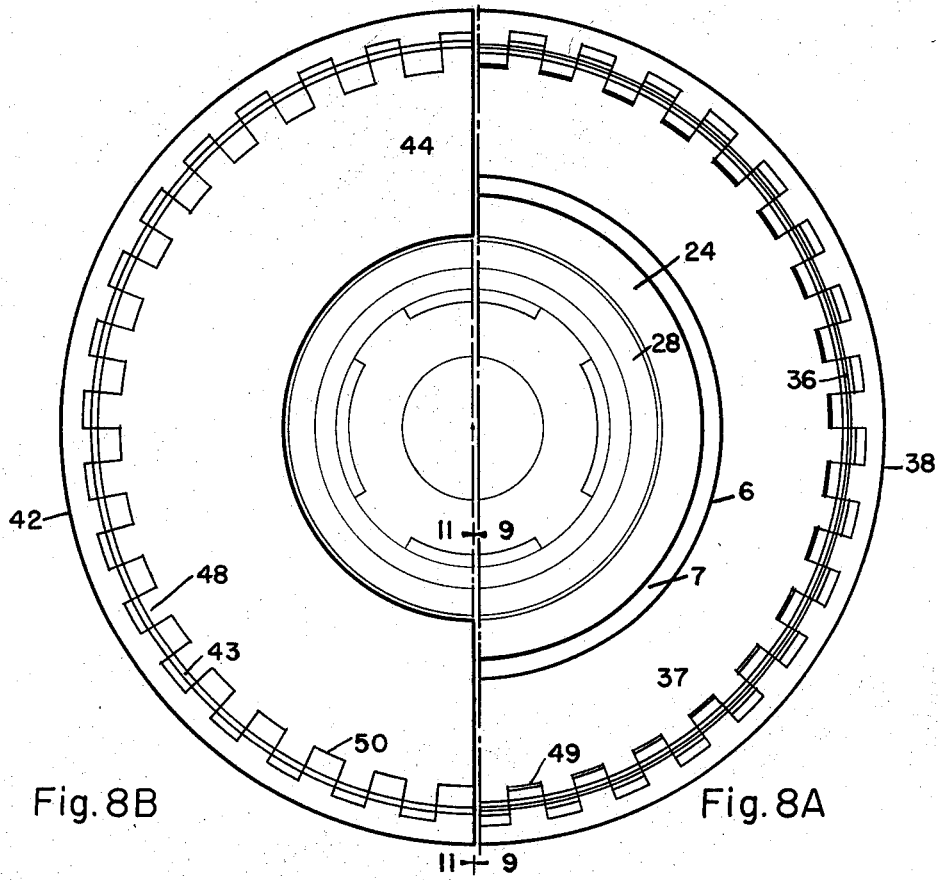
Fig. 8B     Fig. 8A
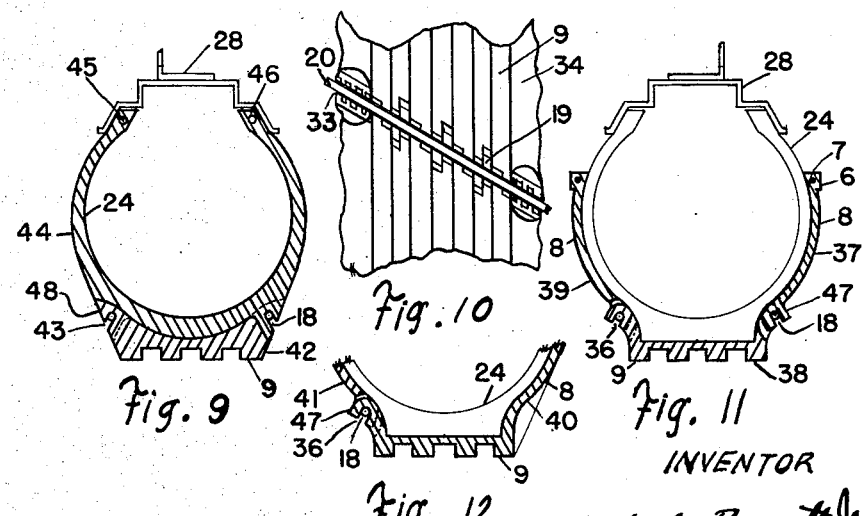
Fig. 9     Fig. 10     Fig. 11
Fig. 12
INVENTOR
Henley Barnett Johnson

United States Patent Office 2,957,509
Patented Oct. 25, 1960

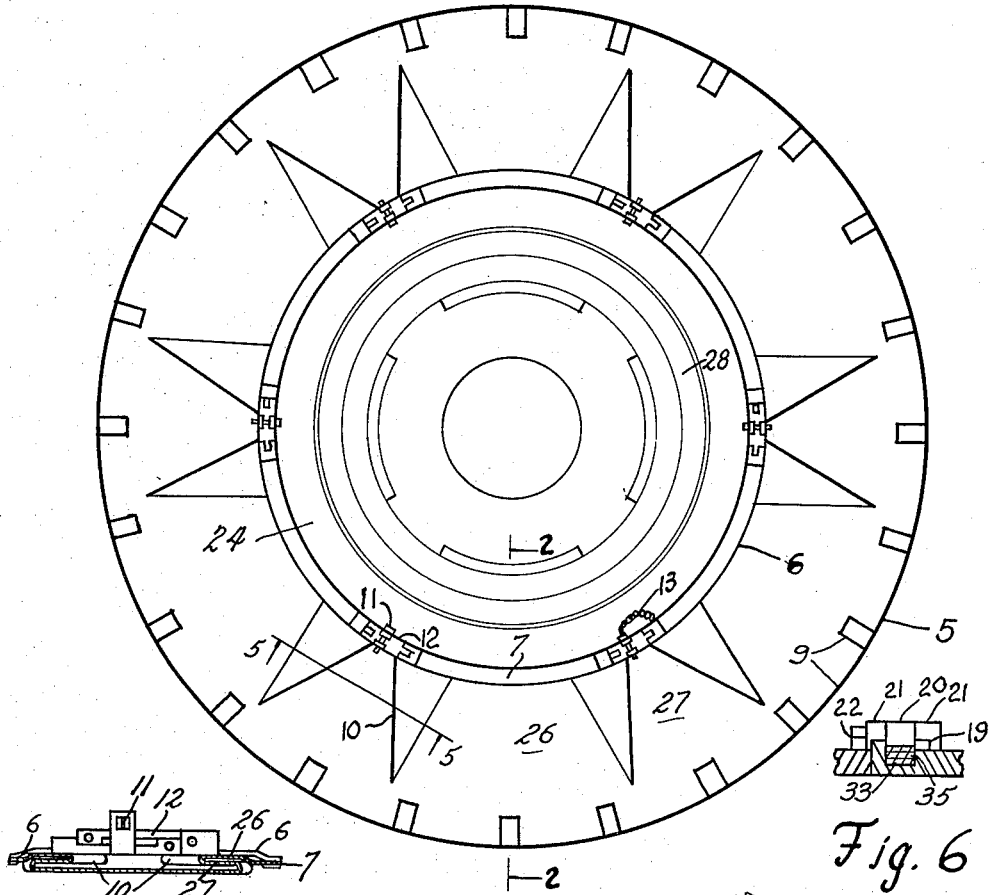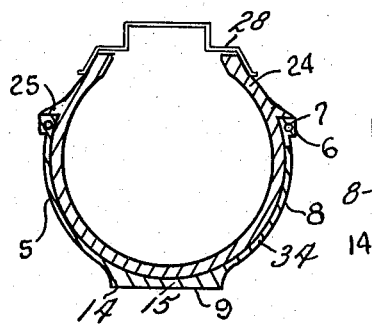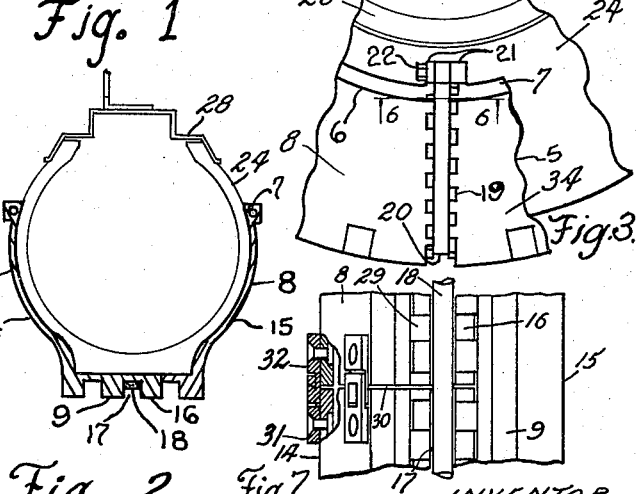

2,957,509

SECTIONAL ANTI-SKID TRACTION ATTACHMENT

Henley Barnett Johnson, 4509 Argyle Terrace NW., Washington, D.C.

Filed Jan. 27, 1959, Ser. No. 789,449

7 Claims. (Cl. 152—173)

This application is a continuation-in-part of my copending application Serial No. 372,106 filed August 8, 1953, now abandoned, and relates to all types and kinds of pneumatic tires.

This invention relates generally to a continuous tread anti-skid traction attachment for a pneumatic tire casing which comprises a close fitting cover and particularly to its readily assemblable and disassemblable construction feature whereby the cover or the tread portion thereof is applicable to and removable from an ordinary pneumatic tire casing or a special form of pneumatic tire casing as a variable tread pneumatic tire assembly, without deflating or distorting said tire and while said tire is inflated and mounted on the rim of a motor vehicle wheel.

The anti-skid traction attachment according to the present invention is flexible, collapsible, and comprised to provide a ready available continuous traction tread more suitable for adverse weather and road conditions, and for special use than the tread manufactured integral with the pneumatic tire casing, said attachment having the new, novel, and useful properties of being an assemblage, developed envelope or pre-formed sectioned cover capable of quick assembly and disassembly applicable to and removable from a pneumatic tire casing without deflating, invariably without distorting and in all instances in said casing's inflated and mounted condition. Said attachment obtains its support by covering said casing almost entirely, and by constricting said casing with the use of suitable folds, clamps, hooks, anchors, and grooves with tightly drawn cables. The application of said attachment to a special made pneumatic tire casing opens a new era in pneumatic tire construction in the form of a variable tread pneumatic tire assembly enjoying all of the above named features in its interchangeability.

One object of the present invention is to provide a continuous tread anti-skid traction attachment for a pneumatic tire casing that is a developed envelope of a pneumatic tire casing cover in the form of a wide circumferential band of material with an anti-skid traction tread design in the center of the outer circumferential surface of the band. The inside diameter of said band is just sufficient to allow a pneumatic tire casing to be positioned inside it concentrically with the anti-skid traction tread on the outer surface of the band. The material of said band overlapping the sides of said casing is folded toward the circumferential center of the assembly along the sides of said casing. The edge of the outer flap of each fold is clamped to the edge of the outer flap of the adjacent fold with a suitable clamp. The parts of the clamp at the edge of each outer flap are connected by a metallic cable embedded in the material of the circumferential side of the flap. The folds of said developed envelope are thus brought together at a circumference slightly larger than that of the rim of the wheel on which the pneumatic tire casing is mounted which comprises a close fitting cover of readily assemblable and disassemblable construction applicable to and removable from the pneumatic tire casing without deflating or distorting said tire and while said tire is inflated and mounted on the rim of a motor vehicle wheel.

An additional object of the present invention is to provide a continuous tread anti-skid traction attachment for a pneumatic tire casing that is a partially developed envelope of a pneumatic tire casing cover with one edge pre-formed to fit the side-wall of the pneumatic tire casing, preferably the hub side of the attachment, the other or axle side of the envelope is developed to its greatest circumferential extent with an anti-skid traction tread design appropriately located on the outer circumferential surface of the envelope. The inside diameter of the envelope is just sufficient to allow a pneumatic tire casing to be positioned inside it concentrically with the anti-skid traction tread on the outer surface of the envelope and with its side-wall on the hub side closely approximated to the pre-formed edge of the envelope. The material of the envelope overlapping the axle side of said casing is folded toward the circumferential center of the assembly along the axle side of said casing. The flaps of each fold are constructed, connected, and positioned as previously described which comprises a close fitting cover of readily assemblable and disassemblable construction application to and removable from the pneumatic tire casing without deflating or distorting said tire and while said tire is inflated and mounted on the rim of a motor vehicle wheel.

In another form of the invention there are provided several types of continuous tread-anti-skid traction attachments for a pneumatic tire casing each of which comprises a close fitting divided cover of readily assemblable and disassemblable construction. The method of division resides in having a plurality of interfaces with projections that are an integral part of said interfaces equally spaced approximately one projection width apart along said interfaces. Each of these projections is suitably slotted on its outer surface to a sufficient depth whereby equal and alternate projections of any one of the several sets of opposing interfaces mesh with their projections interdigitated along the extent of said opposing interfaces. Each slot in each projection is so designed that when this occurs the slots in the projections of the particular set of opposing interfaces line up and form a long groove along the extent of each set of said opposing interfaces. Into each of these long grooves a flexible cable can be drawn and detachably anchored thus securing the cover whereby it is applicable to and removable from the pneumatic tire without deflating or distorting said tire and while said tire is inflated and mounted on the rim of a motor vehicle wheel.

One of the types of this form of the present invention is a continuous tread anti-skid traction attachment for a pneumatic tire casing which comprises a close fitting divided cover of readily assemblable and disassemblable construction. The plurality of dividing interfaces along which the cover is secured are arranged so that some of them oppose similar interfaces made integral with the outer surface of the pneumatic tire casing. All of the dividing interfaces are interfaces with projections that are an integral part of said interfaces equally spaced approximately one projection width apart along said interfaces. Each of these projections is suitably slotted on its outer surface to a sufficient depth whereby equal and alternate projections of any one of the several sets of opposing interfaces mesh with their projections interdigitated along the extent of said opposing interfaces. Each slot in each projection is so designed that when this occurs the slots in the projections of the particular set of opposing interfaces line up and form a long slot or groove along the extent of each set of said opposing interfaces. Into each of these long grooves a flexible cable can be drawn and detachably anchored thus securing the cover whereby it is applicable to and removable from the pneumatic tire without deflating or distorting said tire and while said tire is inflated and mounted on the rim of a motor vehicle wheel.

A second type of this form of the present invention is a continuous tread anti-skid traction attachment for a pneumatic tire that is circumferentially divided into two components. Each component consists of a preformed side-wall and approximately one third of the width of the tread surface with rectangular projections that are an integral part of their respective component equally spaced circumferentially approximately one rectangular projection width apart around the component's circumferential interface. Each rectangular projection extends transversely beyond the component's circumferential interface an additional third of the width of the tread surface and is narrowly slotted on the radially outer side one half its radial depth in a circumferential direction, the center of said slots coinciding with the circumferential center of the tread surface. The component of the assemblage to be fitted to the axle side of the pneumatic tire casing is sectioned radially through the circumferential center of one of the rectangular projections, the one third width of its tread surface and its side-wall. The resulting radial interface is held together with hooks and anchors embedded in the material of the axle side component after said axle side component is passed over the axle of the wheel on which the pneumatic tire casing is mounted. The components are fitted closely to the side-walls of the pneumatic tire casing, with their rectangular projections interdigitated over the middle third of the width of the tread surface. The slots in the rectangular projections line up and form a circumferentially centered groove. A flexible cable is drawn and detachably connected one end to the other in the recess of the groove. The circumferentially divided assemblage is thus secured and comprises a close fitting cover of readily assemblable and disassemblable construction applicable to and removable from the pneumatic tire casing without deflating or distorting said tire and while said tire is inflated and mounted on the rim of a motor vehicle wheel.

A third type of this form of the present invention is a continuous tread anti-skid traction attachment for a pneumatic tire that is again divided into two components. The opposing interfaces in this instance, however, lie in the side-wall on the axle side of the tread surface.

A fourth type of this form of the present invention is a continuous tread anti-skid traction attachment for a pneumatic tire that is divided into three components. The opposing interfaces in this instance lie in the side-walls of the attachment on both sides of the tread surface.

A fifth type of this form of the present invention is a continuous tread anti-skid traction attachment for a pneumatic tire that is divided transversely or obliquely across the entire body of said attachment. The opposing interfaces in this instance lie in the section resulting from division of the attachment in this manner.

Other objects and advantages will be apparent from the following description when read in connection with the accompanying drawing, in which:

Figure 1 is a side elevation of a pneumatic tire casing mounted on the rim of a motor vehicle wheel, shown in phantom lines, provided with a continuous tread anti-skid traction attachment of the envelope type according to the present invention. The notches in the periphery of the figure represent a suitable continuous traction tread provided by the attachment.

Figure 2 is a cross-section through a pneumatic tire casing taken on line 2—2 of Fig. 1 and mounted on the rim of a motor vehicle wheel, shown in phantom lines, provided with a continuous tread anti-skid traction attachment of the circumferentially divided component type according to the present invention.

Figure 3 is a partial side elevation of a pneumatic tire casing mounted on the rim of a motor vehicle wheel, shown in phantom lines, provided with a continuous tread anti-skid traction attachment divided across the entire body according to the present invention. In this view the attachment is cross-sectioned on a radial plane.

Figure 4 is a cross-section through a pneumatic tire worn or manufactured treadless mounted on the rim of a motor vehicle wheel, the wheel rim shown in phantom lines, provided with a continuous tread anti-skid traction attachment which represents any one of the attachments according to the present invention.

Figure 5 is a cross-section showing structure along the line and in the direction of 5—5 of Figure 1 showing a fold of the developed envelope type of attachment and a side view of the clamp provided to hold the edge of the outer flap to the edge of an adjacent outer flap according to the present invention.

Figure 6 is a cross-section showing structure along the line and in the direction of 6—6 of Figure 3 showing the interdigitating rectangular projections of the surface of the interface in the section across the entire body of the attachment. A flexible cable is shown situated in the radially centered groove formed by the slots in the rectangular projections with a method for anchoring the end of said cable to the bead on one side of the attachment according to the present invention.

Figure 7 is a plan view of the tread surface of the circumferentially divided component type of attachment showing the interdigitating rectangular projections of the surfaces of the interfaces of the circumferentially sectioned components and a flexible cable situated in the circumferentially centered groove formed by the slots in the rectangular projections with the axle side component radially sectioned and connected by hooks and anchors embedded in the material of the surfaces of the interfaces according to the present invention.

Figure 8 is a side elevation showing one half of the side view of two of the anti-skid traction attachments according to the present invention. The attachment on the right, Figure 8A, is shown with the opposing interfaces in the side-wall on the side of the tread surface. The attachment on the left, Figure 8B, is shown combined with a specially designed pneumatic casing and comprises a variable tread pneumatic tire assembly. Both attachments are mounted on the rim of a motor vehicle wheel, shown in phantom lines.

Figure 9 is a cross-sectional view taken along the line and in the direction of 9—9 of Figure 8 showing the variable tread pneumatic tire assembly mounted on the rim of a motor vehicle wheel, shown in phantom lines, with the continuous tread anti-skid traction attachment interlocked to a pneumatic casing of special design by means of opposing interfaces in the side walls according to the present invention.

Figure 10 is a plan view of the tread surface of the attachment divided across the entire body on an angle to the central plane of the tire so that objectionable bump would be eliminated over the section across the attachment on a radial plane as shown in Figure 3. Other features are also presented according to the present invention.

Figure 11 is a cross-sectional view taken along the line and in the direction of 11—11 of Figure 8 showing the pneumatic tire casing mounted on the rim of a motor vehicle wheel, shown in phantom lines, provided with a continuous tread anti-skid traction attachment divided into three components with opposing interfaces in the side-walls to either side of the tread surface according to the present invention.

Figure 12 is a partial cross-section similar to Figure 11 through a pneumatic tire casing, shown in phantom lines, provided with a continuous tread anti-skid traction attachment divided into two components with opposing interfaces in the side-wall to the axle side of the tread surface according to the present invention.

Referring now more in detail to the drawings, wherein similar reference characters identify corresponding parts throughout the several views, there is shown in Figure 1 the developed envelope type of continuous tread anti-skid traction attachment 5 which is a circumferential band of material with an anti-skid traction tread design 9 in the center of the outer circumferential surface of the band. The inside diameter of said band is just sufficient to allow a pneumatic tire casing 24 to be positioned inside it concentrically with the anti-skid traction tread 9 on the outer surface of the band 5. The material of said band 5 overlapping the sides of said casing 24 is folded toward the circumferential center of the assembly along the sides of said casing 24. The edge 10 of the outer flap 26 of each fold 27 is clamped to the edge 10 of the outer flap 26 of the adjacent fold 27 with a suitable clamp 12. The parts of the clamp 12 at the edge 10 of each outer flap 26 are connected by a metallic cable 7 embedded in the material of the bead 6 on the outer side of the flap 26. The fold 27 of said developed envelope are thus brought together at a circumference slightly larger than that of the rim 28 of the wheel on which the pneumatic tire casing 24 is mounted. The securing clamp 12 may be locked by the locking pin 11 attached to the clamp by a small chain or flexible wire 13.

The continuous tread anti-skid traction attachment of Figure 2 is an assemblage of circumferentially divided components 14 and 15 which consists of a pre-formed side-wall 8 and approximately one third of the width of the tread surface 9 with rectangular projections 16 that are an integral part of their respective component 14 and 15 equally spaced circumferentially approximately one projection width apart around the component's circumferential interface 29. Each rectangular projection 16 extends transversely beyond the component's circumferential interface 29 an additional third of the width of the tread surface 9 and is narrowly slotted on the outer side approximately one half its radial depth in a circumferential direction, the centers of said slots 17 coincide with the circumferential center of the tread surface 9. The component 14 of the assemblage to be fitted to the axle side of the pneumatic tire casing 24 is sectioned radially through the circumferential center of one of the rectangular projection 16, the one third width of its tread surface 9 and its side-wall 8. The resulting radial interface 30 is held together with hooks 32 and anchors 31 embedded in the material of the axle side component 14 after said axle side component is passed over the axle of the wheel 28 on which the pneumatic tire casing 24 is mounted. The components 14 and 15 are fitted closely to the sidewalls of the pneumatic tire casing 24, and their rectangular projections 16 interdigitate over the middle third of the width of the tread surface 9. The slots 17 in the rectangular projections 16 line up and form a circumferentially centered groove 17. A flexible cable 18 is drawn into the groove 17 and detachably connected one end to the other in the recess of the groove 17.

The continuous tread anti-skid traction attachment of Figure 3 is a pre-formed member 34 shaped throughout its entire circumference to allow close contact with the sidewalls and tread surface of the pneumatic tire casing 24 over most of its external surface. The attachment in this form is sectioned across its entire body, on a radial plane in this view, and the surfaces 35 of the resulting interfaces have rectangular projections 19 of integral construction equally and alternately spaced along the section through the tread surface width 9 and the side-walls 8. Each rectangular projection 19 extends a suitable distance circumferentially from its respective surface 35 of the interface and is narrowly slotted in depth approximately one half its material thickness in a direction parallel with the plane of section, the centers of the slots 33 lie in the plane of section. The surfaces 35 of the interface of the attachment are brought together, after the attachment is fitted closely to the tread surface 9 and side-walls 8 of the pneumatic tire casing 24, and the rectangular projections 19 of the surface of the interface interdigitate circumferentially along the plane of section over the tread surface 9 and the side-walls 8. The slots 33 of the rectangular projections 19 line up and form a groove 33 centered on the plane of section. A flexible cable 20 with its ends suitably formed is anchored on one side at the bead 6 of the attachment and drawn into the groove 33 being detachably anchored to the bead 6 on the other side of the attachment 34.

The continuous tread anti-skid traction attachment of Figure 4 may be any one of the attachments 5, 14 and 15, 34, 37, 38 and 39, 40 and 41, or any other variation thereof. The attachment is shown assembled about a pneumatic tire casing 24 worn or manufactured treadless. A flange 25 is shown which is manufactured with said casing 24 to smooth out the side-wall surface of such an assembly.

In the arrangement shown in Figure 5 the clamp 12 is drawn and locked by pin 11 bringing the edges 10 of the outer flap 26 of fold 27 together. The ends of clamp 12 are attached to metallic band 7 embedded in the material of bead 6.

In the arrangement shown in Figure 6 the flexible cable 20 is shown lying recessed in the groove 33 formed by the slots 33 in the rectangular projections 19 with its ends between bosses 21 secured by screw pin 22. The bosses 21 are made integral with metallic band 7 embedded in the material of bead 6 shown in Figure 3.

The plan view of the tread surface 9 shown in Figure 7 is that of the continuous tread anti-skid traction attachment comprised of circumferentially divided components 14 and 15. The flexible cable 18 is shown situated in the groove 17 created by the slots 17 in the rectangular projections 16 which extend from the surfaces 29. The side-wall 8 of the component 14 is shown radially sectioned, and the surfaces 30 of the interface are shown connected by the hooks 32 and anchors 31 embedded in the material of said surfaces.

The continuous tread anti-skid traction attachments as shown in Figures 8A and 8B are similar. The attachment to the right of the view, Figure 8A, is divided into components 37, 38, and 39, which consist of pre-formed side-walls numbers 37 and 39, and a tread portion 38 with a suitable tread surface 9. The three components are assembled over a pneumatic tire casing 24 mounted on rim 28 by bringing them together along interfaces 49 over the tread and side-walls of pneumatic tire casing 24. The projections 47 on adjacent interfaces interdigitate or mesh and the slots 36 suitably placed in said projections 47 line up to form long slots of grooves into each of which grooves a flexible cable 18 is drawn and detachably anchored in the recess of said grooves. The attachment to the left of the view, Figure 8B, is actually a variable tread pneumatic tire assembly which comprises a specially designed pneumatic casing 44 having interfaces 50 in the side-walls with projections 48 indented by slots 43, and a removable and replaceable tread component 42 having equal and alternate projections 48 on its interfaces 50 indented by slots 43. The components 42 and 44 at assembly have their projections 48 interdigitated along the interfaces 50 and the slots 43 in the projections 48 line up to form long slots or grooves into each of which grooves a flexible cable 18 is drawn and detachably anchored in the recess of said grooves.

The cross-sectional view shown by Figure 9 is of the variable tread pneumatic tire assembly shown mounted on the rim of wheel 28 having a bead 46 with reinforcing cable 45 embedded therein by which it is so mounted as seen in side elevation on the left half of Figure 8. It shows a suitable tread surface 9 on the tread portion 42 and the method of interlocking said portion 42 to the specially designed pneumatic casing 44 by way of tightly drawn cable 18 in the recesses of grooves 43 formed by the slots 43 in the projections 48. The reference character 24 inside the casing 44 identifies it as an air carrying member of the assembly.

The plan view of the tread surface 9 shown in Figure 10 is that of the continuous tread anti-skid traction attachment sectioned across the entire body of the attachment 34. The flexible cable 20 is shown in the groove 33 created by the slots 33 in the projections 19. The attachment in this view is sectioned at an angle to the radial plane of section as seen in Figure 3.

The cross-sectional view shown by Figure 11 is of the cover assembly divided in to three components 37, 38 and 39, as they appear assembled about pneumatic tire casing 24 mounted on the rim of wheel 28 as seen in side elevation on the right half of Figure 8. It shows a suitable tread surface 9 on the tread portion 38 and the method of joining said portion 38 to the side-wall portions 37 and 39. Each side-wall portion 37 and 39 is shown with its side 8 and bead 6 with reinforcing cable 7 embedded therein having interfaces 49, projections 47 and slots 36 suitably arranged to mesh with similar parts on the tread portion 38 whereby slots 36 form grooves 36. The flexible cable 18 is shown situated in the grooves 36 where it is detachably anchored.

The cross-sectional portion of a view shown by Figure 12 is similar to Figure 11 and is of the cover assembly divided into two components 40 and 41, as they appear assembled about a pneumatic casing 24. The dividing interfaces lie in the side-wall 8 to the axle side of the tread surface 9. Side-wall component 41 is similar in construction to component 39 of Figure 11. Component 40 consists of a side-wall and a tread portion there being only one set of opposing interfaces 49 where the projections 47 mesh and interdigitate in the side-wall on the axle side of the tread surface 9 and the slots 36 of said projections 47 line up to form groove 36 into which flexible cable 18 is drawn and shown detachably anchored.

It is therefore clear that the present invention provides a continuous tread anti-skid traction attachment for a pneumatic tire casing which comprises a close fitting cover of readily assemblable and disassemblable construction applicable to and removable from the pneumatic tire casing without deflating or distorting said tire and while said tire is inflated and mounted on the rim of a motor vehicle wheel. The intent of this invention is to make known the possibility of possessing a continuous tread anti-skid traction attachment for a pneumatic tire casing in the form of a close fitting cover for said casing, which is readily available in the event weather changes and road conditions deem it advisable to provide increased traction for the drive wheels of an automotive vehicle, and which answers this need by being of such construction that it may be assembled in minutes and ready to provide the added protection that would sharply reduce the needless waste of human life and injury recorded yearly because of its lack.

Thus, there has been disclosed and described several variations of an anti-skid traction attachment for a pneumatic tire casing, which provides a continuous uninterrupted tread surface for transmitting to the road throughout its entire cross-section and all around its circumference the drive tension of a drive wheel having a pneumatic tire casing mounted thereon, which is easily assemblable to and disassemblable from the pneumatic tire casing without deflating or distorting said tire and in its inflated and mounted condition, and which covers the pneumatic tire casing almost entirely obtaining all available support and stability thereby. It is understood that variations in the present disclosure as to size, integration, resilient material, location and cooperation of parts; for instance, the provision of more than one slot on the projections or the provision of adjustable clamps, hooks and anchors, to accommodate small variations in the size of a pneumatic tire casing; may all be resorted to in order to provide the most suitable version of the disclosure for a particular size pneumatic tire casing, to provide for a special use or to exploit the advantages of new resilient materials, without departing from the spirit of the present invention and the scope of the appended claims.

It is claimed and desired to obtain by Letters Patent of the United States:

1. A continuous tread anti-skid traction attachment for a pneumatic tire which comprises a close fitting divided cover of readily assemblable and disassemblable construction having a plurality of interfaces with projections that are an integral part of said interfaces equally spaced approximately one projection width apart along said interfaces, each projection being suitably slotted on its outer surface to a sufficient depth whereby equal and alternate projections of any one of the several sets of opposing interfaces mesh with their projections interdigitated along the extent of said opposing interfaces and the slots in the projections line up and form a long groove along each set of said opposing interfaces into each of which long grooves a flexible cable can be drawn and detachably anchored securing said cover whereby it is applicable to and removable from the pneumatic tire without deflating or distorting said tire and while said tire is inflated and mounted on the rim of a motor vehicle wheel.

2. A continuous tread anti-skid traction attachment for a pneumatic tire that is circumferentially divided into two components, each component consisting of a pre-formed side-wall having a circumferential interface and a tread portion covering approximately one third of the width of the tread surface with rectangular projections that are an integral part of their respective component equally spaced circumferentially approximately one rectangular projection width apart around said circumferential interface, each rectangular projection extending transversely beyond said circumferential interface an additional third of the width of the tread surface and being narrowly slotted on its radially outer side approximately one half its radial depth in a circumferential direction, the center of said slots coinciding with the circumferential center of the tread surface, one of the components adapted to be fitted to the axle side of the pneumatic tire and being sectioned radially through the circumferential center of one of the rectangular projections, the one third width of the tread portion and its side-wall, and the resulting radial interfaces being held together with hooks and anchors embedded in the material of the axle side component after said component is passed over the axle of the wheel on which the pneumatic tire is mounted, said two components being adapted to fit closely to the side-walls of the pneumatic tire casing, with their rectangular projections interdigitated over the middle third of the width of the tread surface causing the slots in the rectangular projections to line up and form a circumferentially centered groove into which a flexible cable is drawn and detachably connected one end to the other in the groove securing said two components together whereby they comprise a close fitting circumferentially divided cover of readily assemblable and disassemblable construction applicable to and removable from the pneumatic tire without deflating or distorting said tire and while said tire is inflated and mounted on the rim of a motor vehicle wheel.

3. A continuous tread anti-skid traction attachment for a pneumatic tire as set forth in claim 1 divided into two components with said opposing interfaces being in the side-wall of the attachment to the axle side of the tread surface.

4. A continuous tread anti-skid traction attachment for a pneumatic tire as set forth in claim 1 divided into three components with said opposing interfaces being in the side-walls of the attachment on both sides of the tread surface.

5. A continuous tread anti-skid traction attachment for a pneumatic tire as set forth in claim 1 divided transversely across the entire body of said attachment said opposing interfaces being in the resulting section.

6. A continuous tread anti-skid traction attachment for a pneumatic tire which comprises a close fitting divided cover of readily assemblable and disassemblable construction having a plurality of interfaces some of which interfaces oppose similar interfaces on the outer surface of the tire where all interfaces have projections that are an integral part of said interfaces equally spaced approximately one projection width apart along said interfaces, each projection being suitably slotted on its outer surface to a sufficient depth whereby equal and alternate projections of any one of the several sets of opposing interfaces mesh with their projections interdigitated along the extent of said opposing interfaces and the slots in the projections line up and form a long groove along each set of said opposing interfaces into each of which long grooves a flexible cable can be drawn and detachably anchored securing said cover whereby it is applicable to and removable from the pneumatic tire without deflating or distorting said tire and while said tire is inflated and mounted on the rim of a motor vehicle wheel.

7. A continuous tread anti-skid traction attachment for a pneumatic tire as set forth in claim 1 divided obliquely across the entire body of said attachment said opposing interfaces being in the resulting section.

References Cited in the file of this patent

UNITED STATES PATENTS

| | | |
|---|---|---|
| 662,208 | Vreeland | Nov. 20, 1900 |
| 2,571,020 | Earl | Oct. 9, 1951 |